United States Patent
Naito

(10) Patent No.: US 9,419,791 B2
(45) Date of Patent: Aug. 16, 2016

(54) HASH VALUE CALCULATION DEVICE, HASH VALUE CALCULATION METHOD, AND NON-TRANSITORY COMPUTER-READABLE STORAGE MEDIUM INCLUDING COMPUTER EXECUTABLE INSTRUCTION

(71) Applicant: Mitsubishi Electric Corporation, Tokyo (JP)

(72) Inventor: Yusuke Naito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/420,022

(22) PCT Filed: Sep. 13, 2013

(86) PCT No.: PCT/JP2013/074801
§ 371 (c)(1),
(2) Date: Feb. 6, 2015

(87) PCT Pub. No.: WO2014/046024
PCT Pub. Date: Mar. 27, 2014

(65) Prior Publication Data
US 2015/0215113 A1 Jul. 30, 2015

(51) Int. Cl.
*H04L 9/00* (2006.01)
*H04L 9/06* (2006.01)
*G09C 1/00* (2006.01)

(52) U.S. Cl.
CPC .............. *H04L 9/0643* (2013.01); *G09C 1/00* (2013.01); *H04L 9/0618* (2013.01); *H04L 2209/24* (2013.01); *H04L 2209/30* (2013.01)

(58) Field of Classification Search
CPC .................................... H04L 9/06; H04L 9/00
USPC ............................................................ 380/28
See application file for complete search history.

(56) References Cited

U.S. PATENT DOCUMENTS

| 8,787,563 B2 | 7/2014 | Shirai et al. |
| 2010/0046742 A1* | 2/2010 | Muratani ............... H04L 9/3013 380/28 |

(Continued)

FOREIGN PATENT DOCUMENTS

| JP | 2010-049127 | 3/2010 |
| JP | 2012-68436 | 4/2012 |

OTHER PUBLICATIONS

International Search Report Issued Nov. 19, 2013 in PCT/JP13/074801 filed Sep. 13, 2013.

(Continued)

*Primary Examiner* — Anthony Brown
(74) *Attorney, Agent, or Firm* — Oblon, McClelland, Maier & Neustadt, L.L.P

(57) ABSTRACT

The object is to constitute a hash function by removing a feed-forward arithmetic operation. A hash value calculation device, for each integer i of i=1, . . . , L in an ascending order, calculates a function f[i] which, upon input of a value M[i] having k-n bits, an n-bit value y1[i−1] (a value y1[0] is a predetermined value IV1), and an n-bit value y2[i−1] (a value y2[0] is a predetermined value IV2), outputs an n-bit value x1[i], an n-bit value x2[i], a k-bit value k1[i], and a k-bit value k2[i]; for the value x1[i] as a plaintext and the value k1[i] as a key, calculates an n-bit value y1[i] with an encryption function of a block cipher; and for the value x2[i] as a plaintext and the value k2[i] as a key, calculates an n-bit value y2[i] with the encryption function for the block cipher. The hash value calculation device, upon input of a value y1[L] and a value y2[L] which are calculated, calculates a hash value with an injective function g.

8 Claims, 12 Drawing Sheets

(56) References Cited

U.S. PATENT DOCUMENTS

| | | | | |
|---|---|---|---|---|
| 2010/0142701 A1* | 6/2010 | Volkoff | ............. | G06F 17/30156 380/28 |
| 2010/0146296 A1* | 6/2010 | Kim | ...................... | H04L 9/3239 713/189 |

OTHER PUBLICATIONS

Hirose, S., "Secure Double Block Length Hash Functions Based on Abreast/Tandem Davies-Meyer", IPSJ SIG Notes, vol. 2004, No. 75, pp. 21-26, 2004 (with English abstract).

Naito, Y., "Blockcipher-Based Double-Length Hash Functions for Pseudorandom Oracles", Cryptology ePrint Archive: Report 2010/566, Version: 20110511:021845, Retrieved from the Internet, URL: <http://eprint.iacr.org/2010/566.pdf>, [retrieved on Oct. 25, 2013], (19 Pages), 2011.

Dodis, Y., et al. "Salvaging Merkle-Damgard for Practical Applications", LNCS, Advances in Cryptology-EUROCRYPT, vol. 5479, pp. 371-388 , 2009.

Lee, J. et al., "The Collision security of Tandem-DM in the ideal Cipher Model", CRYPTO, Lecture Notes in Computer Science 6841, (26 pages), 2011.

Fleischmann, E. et al., "Security of Cyclic Double Block Length Hash Functions Including Abreast-DM", IMA Int. Conf., Lecture Notes in Computer Science 5921, ( 25 pages), 2009.

Hirose, S.,"Some Plausible Constructions of Double-Block-Length Hash Functions", FSE, Lecture Notes in Computer Science 4047, (16 pages), 2006.

Lai, X. et al., "Hash Functions Based on Block Ciphers", EUROCRYPT'92, Lecture Notes in Computer Science 658, pp. 55-70, 1993.

Onur Ozen and Martijin Stam, "Another Glance at Double-Length Hashing," Cryptography and Coding, 2009, pp. 176-201, 26 Pages.

Extended European Search Report mailed May 31, 2016 in European Patent Application No. 13839043.0.

\* cited by examiner

US 9,419,791 B2

HASH VALUE CALCULATION DEVICE, HASH VALUE CALCULATION METHOD, AND NON-TRANSITORY COMPUTER-READABLE STORAGE MEDIUM INCLUDING COMPUTER EXECUTABLE INSTRUCTION

TECHNICAL FIELD

The present invention to a technique that calculates a hash value securely even when a compression function is such that its inverse element can be calculated.

BACKGROUND ART

A hash function is a function which, upon input of an arbitrary-length value, outputs a fixed-length hash value.

Non-patent literatures 3 and 4 describe a hash function that utilizes, as a block cipher encryption function, a compression function constituted using, for example, AES-256. In order that the hash function described in non-patent literatures 3 and 4 satisfies a collision resistance, employed AES-256 must be an idealized block cipher (see non-patent literatures 1 to 3).

This hash function is a hash function which, where a block cipher has an n-bit plaintext length, forms a hash value having a 2n-bit length.

An idealized block cipher is a block cipher selected randomly from a set of all block ciphers having an n-bit plaintext length (block length) and a k-bit key length.

When a hash function H having a w-bit output length satisfies a collision resistance, it signifies that it is difficult to find two different input values M and M' for which H(M)=H(M') holds. Strictly, a hash function is considered to satisfy a collision resistance if such input values cannot be found through hash value calculation of $2^{w/2}$ times or less.

CITATION LIST

Non-Patent Literature

Non-Patent Literature 1: Jooyoung Lee, Martijn Stam, and John P. Steinberger. The Collision Security of Tandem-DM in the Ideal Cipher Model. CRYPTO 2011. pp 561-577. Lecture Notes in Computer Science 6841.
Non-Patent Literature 2: Ewan Fleischmann, Michael Gorski, and Stefan Lucks. Security of Cyclic Double Block Length Hash Functions. IMA Int. Conf. 2009. pp 153-175. Lecture Notes in Computer Science 5921.
Non-Patent Literature 3: Shoichi Hirose. Some Plausible Constructions of Double-Block-Length Hash Functions. FSE 2006. pp 210-225. Lecture Notes in Computer Science 4047.
Non-Patent Literature 4: X. Lai and J. L. Massey. Hash Functions Based on Block Ciphers. EUROCRYPT'92. pp 55-70. Lecture Notes in Computer Science 658.

SUMMARY OF INVENTION

Technical Problem

In the hash function described in Non-patent literatures 3 and 4, an exclusive disjunction of a plaintext component, being an input to an encryption function that constitutes a compression function, and a ciphertext component, being an output from the encryption function, is treated as an output from the compression function, in order that an input to the compression function is difficult to obtain from the output from the compression function. In the following explanation, an arithmetic operation that uses an exclusive disjunction of a plaintext component and a ciphertext component, as an output from a compression function will be called feed-forward arithmetic operation.

In cases where the feed-forward arithmetic operation is employed, inputs to the encryption function must be recorded until calculation of an output from the encryption function is completed, and a memory for this purpose is accordingly required. When, however, the feed-forward arithmetic operation is removed in order to reduce the memory usage, it becomes possible to calculate an input to the compression function from an output from the compression function, which is undesirable. Using the properties that the input can be calculated from the output, breaching of the collision resistance of the compression function becomes possible. If a hash function is constituted using a compression function whose collision resistance has been breached, the hash function will no longer be able to satisfy the collision resistance.

It is an object of the present invention to constitute a hash function by, for example, removing the feed-forward arithmetic operation while satisfying the collision resistance.

Solution to Problem

A hash value calculation device according to this invention is a hash value calculation device that calculates a hash value using an encryption function for a block cipher having an n-bit plaintext length and a k-bit (k>n) key length, the hash value calculation device comprising:
a default-length value input part that receives L (L is an integer of 2 or more) of values M[1], . . . , M[L] each having k-n bits;
a compression function calculation part that, for each integer i of i=1, . . . , L in an ascending order: calculates a function f[i] which, upon input of a value M[i] received by the default-length value input part, an n-bit value y1[$i$−1] (a value y1[0] is a predetermined value IV1), and an n-bit value y2[$i$−1] (a value y2[0] is a predetermined value IV2), outputs an n-bit value x1[$i$], an n-bit value x2[$i$], a k-bit value k1[$i$], and a k-bit value k2[$i$]; for the value x1[$i$] as a plaintext and the value k1[$i$] as a key, calculates an n-bit value y1[$i$] with the encryption function; and for the value x2[$i$] as a plaintext and the value k2[$i$] as a key, calculates an n-bit value y2[$i$] with the encryption function; and
a hash value calculation part that, upon input of a value y1[L] and a value y2[L] which are calculated by the compression function calculation part, calculates a hash value with an injective function g.

Advantageous Effects of Invention

The hash value calculation device according to the present invention does not use the feed-forward arithmetic operation. Hence, in the hash value calculation device according to the present invention, the memory usage can be reduced. Also, in the hash value calculation device according to the present invention, the collision resistance is satisfied if the block cipher encryption function is an idealized block cipher.

DESCRIPTION OF EMBODIMENTS

Embodiment 1

Figure 1:
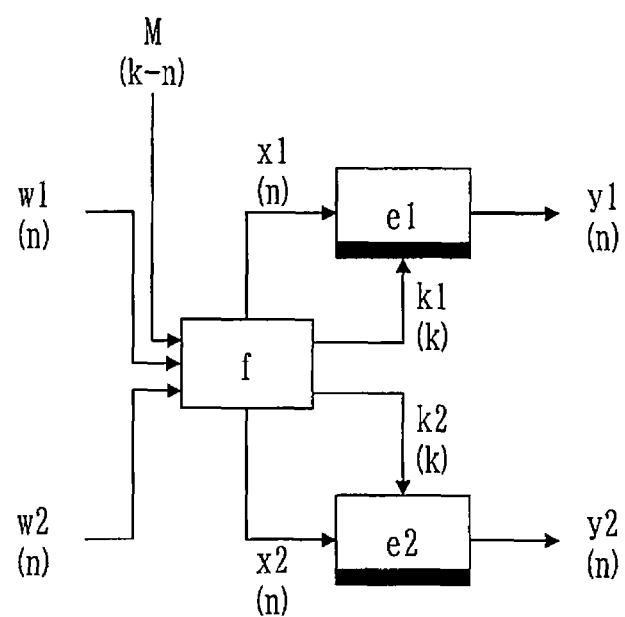
FIG. 1 is a structural diagram of a compression function c utilized in a hash function according to Embodiment 1.

FIG. 1 is a structural diagram of a compression function c utilized in a hash function according to Embodiment 1.

The compression function c is constituted using a function f, and two encryption functions e1 and e2 for a block cipher having an n-bit plaintext length and a k-bit key length.

The function f, upon input of three values M, w1, and w2, outputs four values x1, x2, k1, and k2. The value M has k-n bits. The values w1 and w2 each have n bits. The values x1 and x2 each have n bits. The values k1 and k2 each have k bits.

The function f satisfies the following three conditions (1) to (3): (1) The function f is injective. (2) Where the value M is a fixed value, an injective relation holds between the values w1, w2 and the values x1, x2. (3) The values x1 and x2 are not equal, or the values k1 and k2 are not equal.

The encryption function e1, for the value x1 being an output from the function f, as a plaintext, and the value k1 being an output from the function f, as a key, outputs an n-bit value y1.

The encryption function e2, for the value x2 being an output from the function f, as a plaintext, and the value k2 being an output from the function f, as a key, outputs an n-bit value y2.

The encryption functions e1 and e2 can be the same encryption functions.

Figure 2:
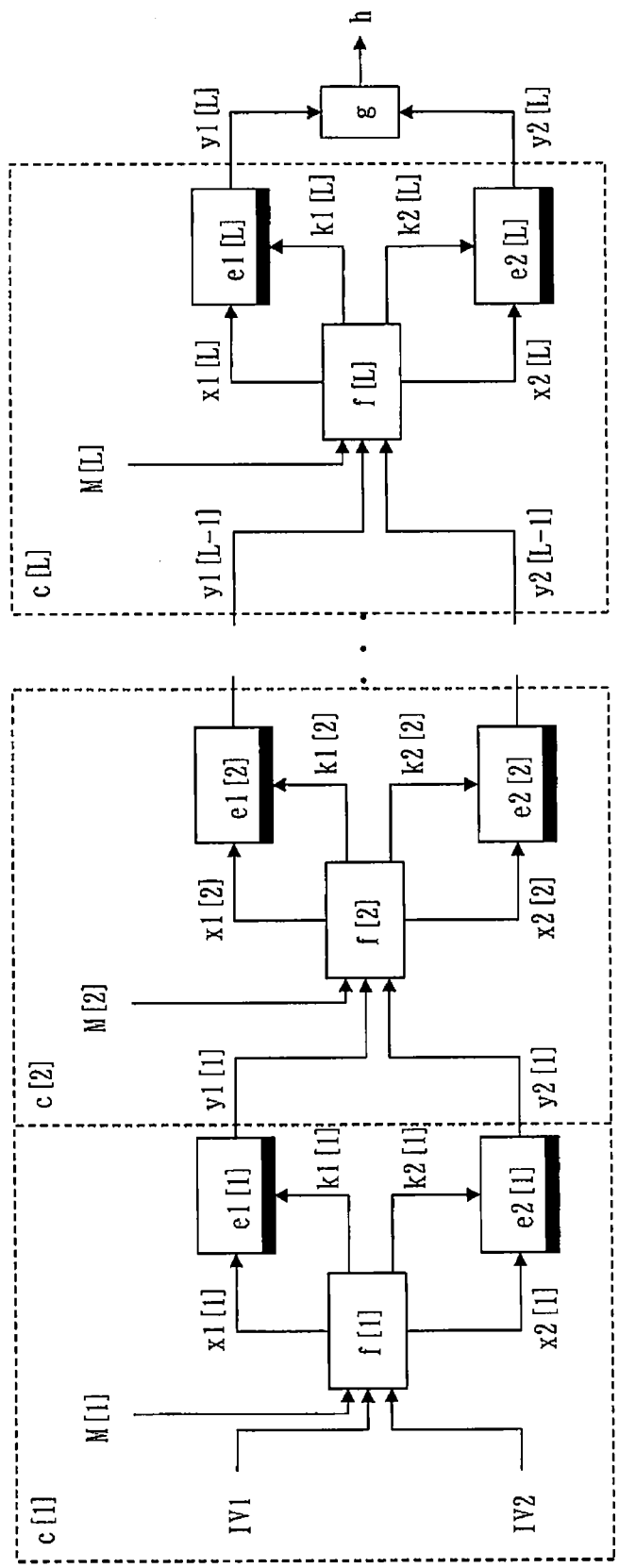
FIG. 2 is a structural diagram of the arithmetic operation part of the hash function according to Embodiment 1.

FIG. 2 is a structural diagram of the arithmetic operation part of the hash function according to Embodiment 1.

The arithmetic operation part of the hash function, upon input of L (L is an integer of 2 or more) of input values M[1], . . . , M[L] each having k-n bits, calculates a hash value h.

The arithmetic operation part of the hash function is constituted using L of compression functions c[1], . . . , c[L] and a function g which combines two input values.

A compression function c[i] for each integer i of i=1, . . . , L is the compression function c shown in FIG. 1, and has a function f[i] being the function f shown in FIG. 1, an encryption function e1[i] being the encryption function e1 shown in FIG. 1, and an encryption function e2[i] being the encryption function e2 shown in FIG. 1.

The top compression function c[1], for a value M[1] as the value M, a predetermined fixed value IV1 as the value w1, and a predetermined fixed value IV2 as the value w2, outputs values y1[1] and y2[1].

More specifically, first, upon input of three values including the value M[1], the fixed value IV1, and the fixed value IV2, the function f[1] outputs four values x1[1], x2[1], k1[1], and k2[1]. Subsequently, for the value x1[1] as a plaintext and the value k1[1] as a key, an encryption function e1[1] outputs the value y1[1]. Also, for the value x2[1] as a plaintext and the value k2[1] as a key, an encryption function e2[1] outputs the value y2[1].

The compression function c[i] for each i of i=2, . . . , L, for a value M[i] as the value M, a value y1[i−1] as the value w1, and a value y2[i−1] as the value w2, outputs values y1[i] and y2[i].

More specifically, first, upon input of the three values M[i], y1[i−1], and y2[i−1], the function f[i] outputs four values including values x1[i], x2[i], k1[i], and k2[i]. Subsequently, for the value x1[i] as a plaintext and the value k1[i] as a key, an encryption function e1[i] outputs the value y1[i]. Also, for the value x2[i] as a plaintext and the value k2[i] as a key, an encryption function e2[i] outputs the value y2[i].

The function g is an injective function, and upon input of an n-bit value y1[L] and an n-bit value y2[L] which are outputted by a compression function c[L], outputs a result as a 2n-bit hash value h.

For example, the function g adds the bits of the value y2[L] after the bits of the value y1[L]. Naturally, the function g may add the bits of the value y1[L] after the bits of the value y2[L], or combine the bits of the value y1[L] and the bits of the value y2[L] in an arbitrary order.

Figure 3:
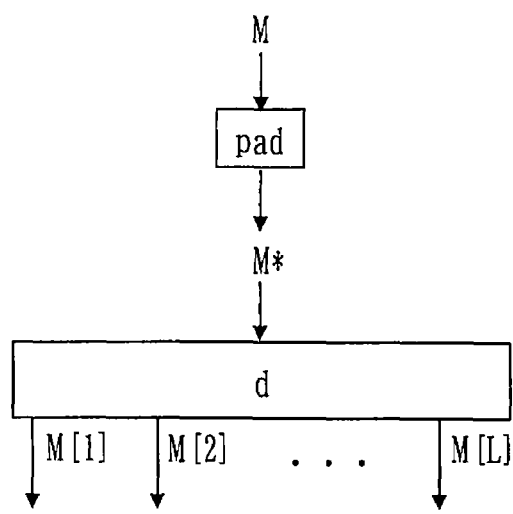
FIG. 3 is a structural diagram of the input part of the hash function according to Embodiment 1.

FIG. 3 is a structural diagram of the input part of the hash function according to Embodiment 1.

In the input part of the hash function, L of input values M[1], . . . , M[L] to be inputted to the arithmetic operation part are calculated.

The input part of the hash value is constituted using a padding function pad and a partition function d.

The padding function pad, upon input of the value M, outputs a value M* having a length that is L times as large as (k-n).

The function pad, upon input of two arbitrary values a and b, outputs 2 values a* and b*, each of which has a length that is L times as large as (k-n) and one of which does not form a suffix for the other. Not forming a suffix signifies that one value out of the two values a* and b* is not equal to some least-significant bits of the other value.

For example, the function pad adds 1 after the value M, adds a necessary bit number of 0 after 1, and adds a value <M> after the necessary bit number of 0, thus forming a value M*. The value <M> is a bit representation value, by j bits, of the bit length of the value M. For example, assuming j=64, if the value M has an 8-bit length, the value <M> is 0 . . . 0100.

The partition function d partitions the value M* calculated by the function pad equally into k-n bits sequentially from the top, and outputs values M[1] . . . , M[L].

Figure 4:
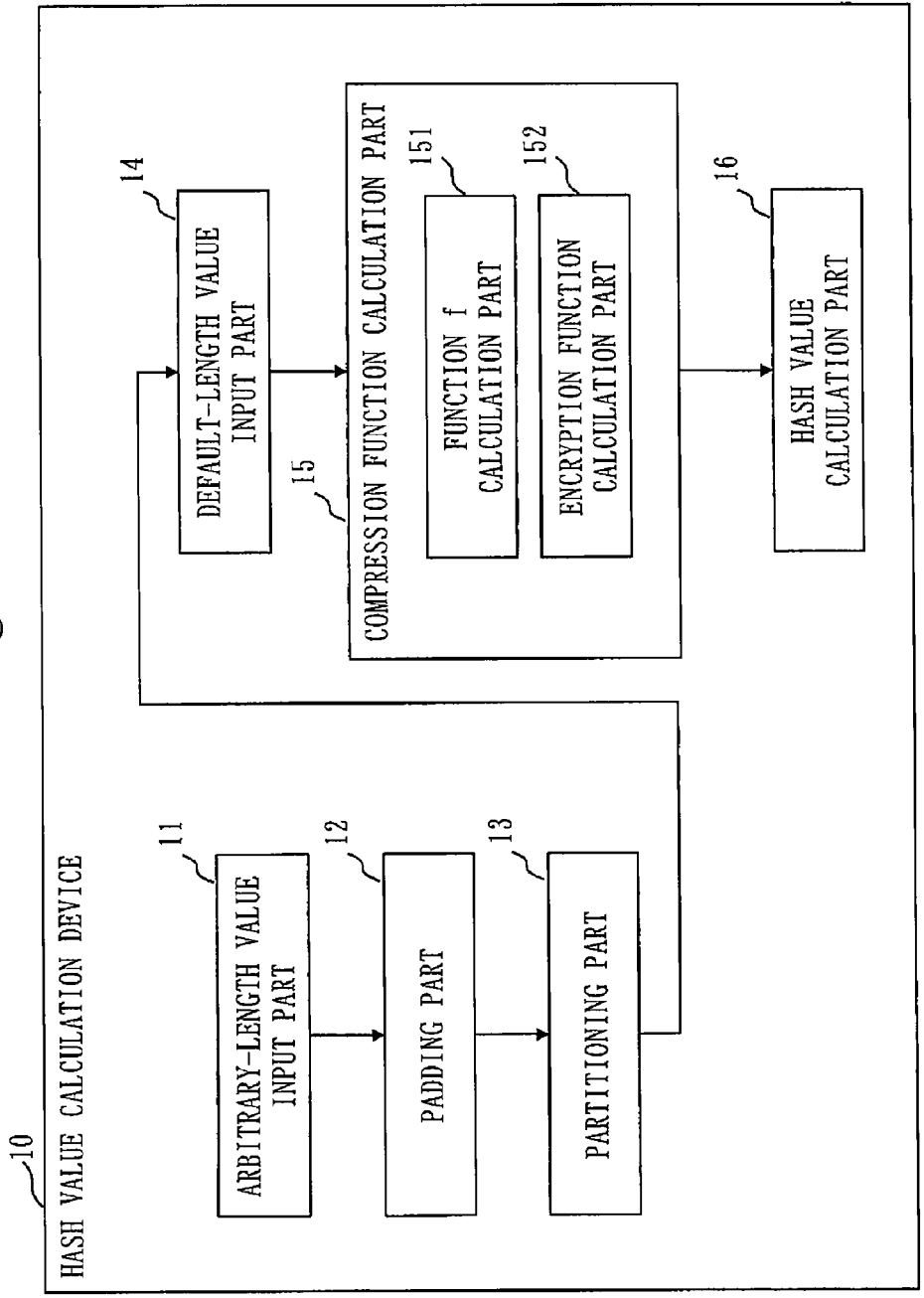
FIG. 4 is a configuration diagram of a hash value calculation device 10 according to Embodiment 1.

FIG. 4 is a configuration diagram of a hash value calculation device 10 according to Embodiment 1.

The hash value calculation device 10 implements the hash function described above.

The hash value calculation device 10 includes an arbitrary-length value input part 11, a padding part 12, a partitioning part 13, a default-length value input part 14, a compression function calculation part 15, and a hash value calculation part 16.

The arbitrary-length value input part 11, the padding part 12, and the partitioning part 13 calculate the input part of the hash function. The default-length value input part 14, the compression function calculation part 15, and the hash value calculation part 16 calculate the arithmetic operation part of the hash function.

The arbitrary-length value input part 11 receives, with an input device, the arbitrary-length value M.

The padding part 12, upon input of the value M received by the arbitrary-length value input part 11, calculates the function pad with a processing device, and outputs the value M*.

The partitioning part 13, upon input of the value M*, calculates the partition function d with the processing device, and outputs the values M[1] . . . , M[L].

With the input device, the default-length value input part 14 receives the values M[1] . . . , M[L] outputted by the partitioning part 13.

The compression function calculation part 15, upon input of the values M[1] . . . , M[L] received by the default-length value input part 14, calculates the compression function c[1], . . . , c[L] with the processing device, and outputs the values y1[L] and y2[L]. The compression function calculation part 15 includes a function f calculation part 151 and an encryption function calculation part 152. The function f calculation part 151 calculates functions f[1], . . . , f[L] that constitute the compression function, with the processing device. The encryption function calculation part 152 calculates encryption functions e1[1], . . . , e1[L] and encryption functions e2[1], . . . , e2[L] that constitute the compression function, with the processing device.

The hash value calculation part 16, upon input of the values y1[L] and y2[L] outputted by the compression function calculation part 15, calculates the function g with the processing device, and outputs the hash value h to an output device.

Figure 5:
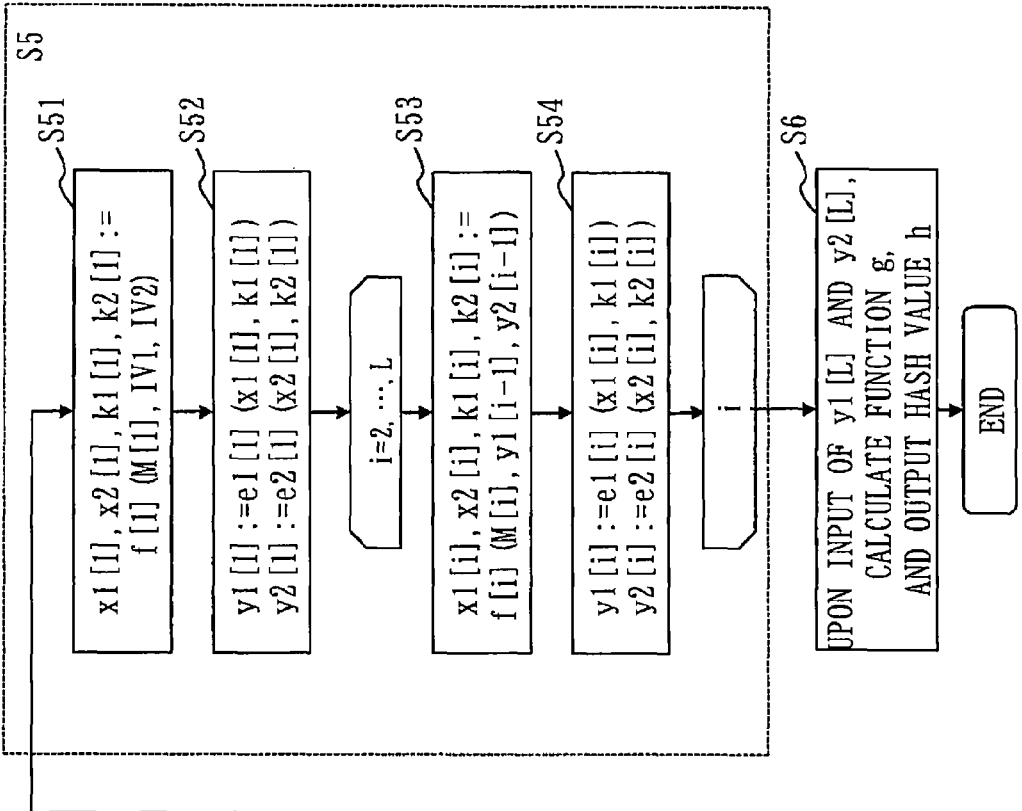
FIG. 5 is a flowchart showing the operation of the hash value calculation device 10 according to Embodiment 1.
Figure 5:
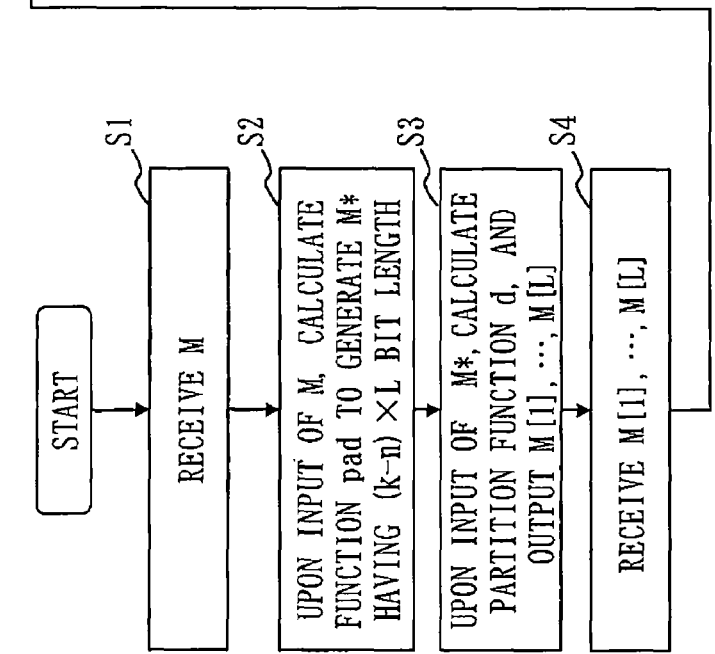

FIG. 5 is a flowchart showing the operation of the hash value calculation device 10 according to Embodiment 1.

(S1: Arbitrary-Length Value Input Step)

The arbitrary-length value input part 11 receives the value M having an arbitrary bit length.

(S2: Padding Step)

The padding part 12, upon input of the value M received in (S1), calculates the function pad, and outputs the value M* having (k−n)×L bits.

(S3: Partition Step)

The partitioning part 13, upon input of the value M* outputted in (S2), calculates the partition function d with the processing device, and outputs values M[1], . . . , M[L] each having (k−n) bits.

(S4: Default-Length Value Input Step)

The default-length value input part 14 receives, with the input device, the values M[1], . . . , M[L] outputted in (S3).

(S5: Compression Function Calculation Step)

The function calculation step includes four steps of (S51) to S(54).

(S51: Function f Calculation Step (1))

The function f calculation part 151, upon input of the three values including the value M[1], the fixed value IV1, and the fixed value IV2, calculates the function f[1], and outputs four values x1[1], x2[1], k1[1], and k2[1].

(S52: Encryption Function Calculation Step (1))

The encryption function calculation part 152, for the value x1[1] as a plaintext and the value k1[1] as a key, calculates the encryption function e1[1], and outputs the value y1[1]. Also, the encryption function calculation part 152, for the value x2[1] as a plaintext and the value k2[1] as a key, calculates the function encryption e2[1], and outputs the value y2[1].

Subsequently, the processes of (S53) to (S54) are executed for each integer i of i=2, . . . , L in an ascending order.

(S53: Function f Calculation Step (2))

The function f calculation part 151, upon input of three values M[i], y1[i−1], and y2[i−1], calculates the function f[i], and outputs four values including the values x1[i], x2[i], k1[i], and k2[i].

(S54: Encryption Function Calculation Step (2))

The encryption function calculation part 152, for the value x1[i] as a plaintext and the value k1[i] as a key, calculates the encryption function e1[i], and outputs the value y1[i]. Also, the encryption function calculation part 152, for the value x2[i] as a plaintext and the value k2[i] as a key, calculates the encryption function e2[i], and outputs the value y2[i].

(S6: Hash Value Calculation Step)

The hash value calculation part 16, upon input of the values y1[L] and y2[L] outputted in (S5), calculates the function g, and outputs the hash value h.

As described above, the hash value calculation device 10 according to Embodiment 1 constitutes a hash function without using the feed-forward arithmetic operation. This can reduce the memory usage.

Also, the hash value calculation device 10 according to Embodiment 1 treats the plaintext component of the block cipher encryption function, as the ciphertext component of the preceding encryption function. A hash function satisfying the collision resistance can be implemented for cases where the block cipher encryption function is an idealized block cipher.

In the case of AES-256, usually, the plaintext length is 128 bits. The length of 128 bits is short for a hash value length. The collision resistance of a hash function having an output length of 128 bits requires a calculation amount corresponding to $2^{64}$ times of hash value calculation by brute force attack. This falls within a range where calculation by a computer is possible. Hence, in the hash function according to Embodiment 1, one compression function uses a block cipher encryption function twice, so that the output has a 256-bit length, which is twice the plaintext length. Such a hash function whose output length is twice the plaintext length of the encryption function is called double-block-length hash function.

Embodiment 2

Embodiment 1 explained the hash function in which the compression function is constituted using the functions f[1], . . . , f[L] that satisfy three conditions. Embodiment 2 will explain a hash function in which functions f[1], . . . , f[L] are more specified.

Embodiment 2 is the same as Embodiment 1 except for a function f.

Figure 6:
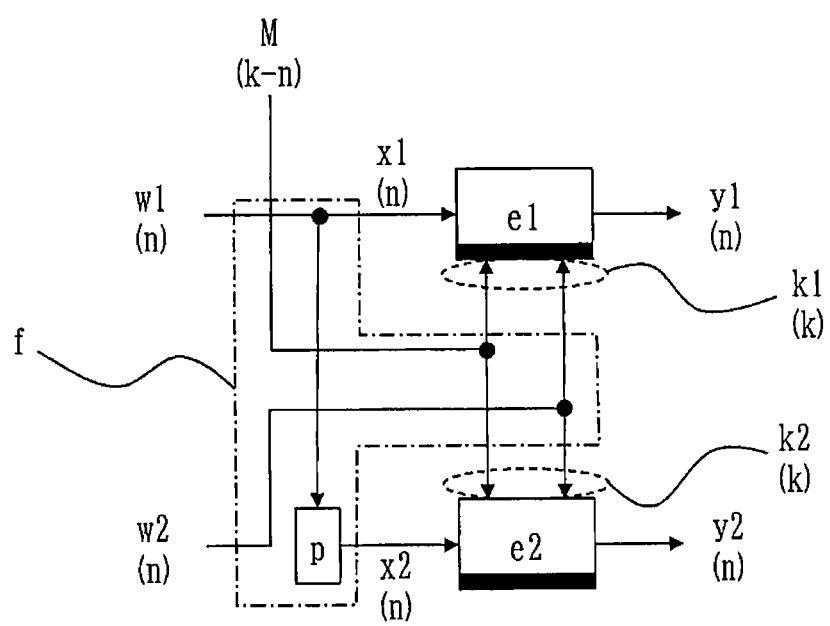
FIG. 6 is a structural diagram of a compression function c utilized in a hash function according to Embodiment 2.

FIG. 6 a structural diagram of a compression function c utilized in the hash function according to Embodiment 2.

The compression function c is constituted using a function f, and two encryption functions e1 and e2 for a block cipher having an n-bit plaintext length and a k-bit key length. The encryption functions e1 and e2 are the same as the encryption functions e1 and e2 according to Embodiment 1.

The function f, upon input of three values M, w1, and w2, outputs four values x1, x2, k1, and k2. The value M has k−n bits. The values w1 and w2 each have n bits. The values x1 and x2 each have n bits. The values k1 and k2 each have k bits.

The function f makes the value w1 into the value x1, makes the value w1 into the value x2 through conversion with a substitute function p, and makes the value M and value w2 in combination into the values k1 and k2.

The function f may arrange the bits of the value M and the bits of the value w2 in arbitrary orders, thus forming the values k1 and k2. For example, the function f adds the bits of the value w2 after the bits of the value M, thus forming the values k1 and k2.

The substitute function p is an n-bit substitute function, and is a function in which p(x)≠x holds for an arbitrary n-bit value x. For example, the substitute function p is a function that calculates the exclusive disjunction of an n-bit input value x and an n-bit fixed value c, or a function that adds an n-bit fixed value c to an n-bit input value x, and outputs a least significant n-bit value.

Figure 7:
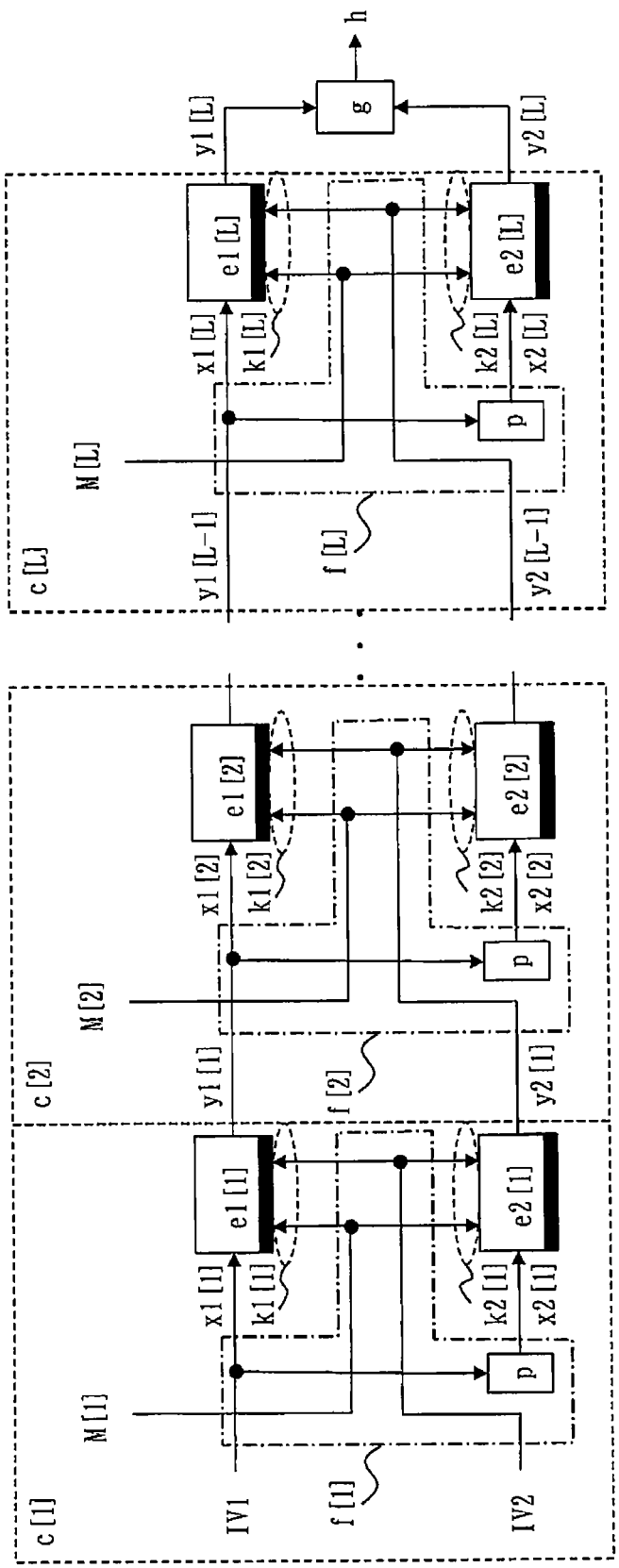
FIG. 7 is a structural diagram of the arithmetic operation part of the hash function according to Embodiment 2.

FIG. 7 is a structural diagram of the arithmetic operation of the hash function according to Embodiment 2.

In a top compression function c[1], first, upon input of three values including a value M[1], a fixed value IV1, and a fixed value IV2, a function f[1] outputs four values x1[1], x2[1], k1[1], and k2[1]. In the function f[1], the fixed value IV1 is made into the value x1[1]. The fixed value IV1 is made into the value x2[1] through conversion with the substitute function p. The value M[1] and the fixed value IV2 in combination are made into the values k1[1] and k2[1]. Subsequently, for the value x1[1] as a plaintext and the value k1[1] as a key, the encryption function e1[1] outputs the value y1[1]. Also, for the value x2[1] as a plaintext and the value k2[1] as a key, the encryption function e2[1] outputs the value y2[1].

In a compression function c[i] for each i of i=2, ..., L, first, upon input of three values M[i], y1[i−1], and y2[i−1], a function f[i] outputs four values x1[i], x2[i], k1[i], and k2[i]. In the function f[i], a value y1[i−1] is made into a value x1[i]. The value y1[i−1] is made into a value x2[i] through conversion with the substitute function p. A value M[i] and a value y2[i−1] in combination are made into values k1[i] and k2[i]. Subsequently, for the value x1[i] as a plaintext and the value k1[i] as a key, an encryption function e1[i] outputs a value y1[i]. Also, for the value x2[i] as a plaintext and the value k2[i] as a key, an encryption function e2[i] outputs a value y2[i].

Embodiment 3

Embodiment 3, as with Embodiment 2, will explain a hash function in which functions f[1], ..., f[L] are more specified.

Embodiment 3 is the same as Embodiment 1 except for a function f.

Figure 8:
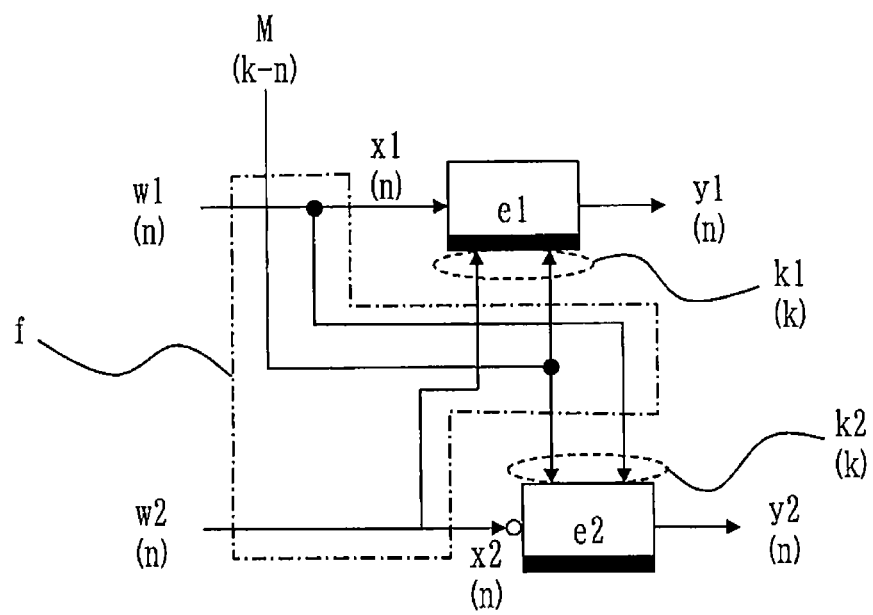
FIG. 8 is a structural diagram of a compression function c utilized in a hash function according to Embodiment 3.

FIG. 8 is a structural diagram of a compression function c utilized in the hash function according to Embodiment 3.

The compression function c is constituted using a function f, and two encryption functions e1 and e2 for a block cipher having an n-bit plaintext length and a k-bit key length. The encryption functions e1 and e2 are the same as the encryption functions e1 and e2 according to Embodiment 1.

The function f, upon input of three values M, w1, and w2, outputs four values x1, x2, k1, and k2. The value M has k−n bits. The values w1 and w2 each have n bits. The values x1 and x2 each have n bits. The values k1 and k2 each have k bits.

The function f makes the value w1 into the value x1, makes the value w2 into the value x2 through inversion of the respective bits, makes the value M and value w2 in combination into the value k1 and makes the value M and value w1 in combination into the value k2.

The function f may arrange the bits of the value M and the bits of the value w2 in an arbitrary order, thus forming the value k1, and may arrange the bits of the value M and the bits of the value w1 in an arbitrary order, thus forming the value k2. For example, the function f adds the bits of the value M after the bits of the value w2, thus forming the value k1, and adds the bits of the value w1 after the bits of the value M, thus forming the value k2.

Figure 9:
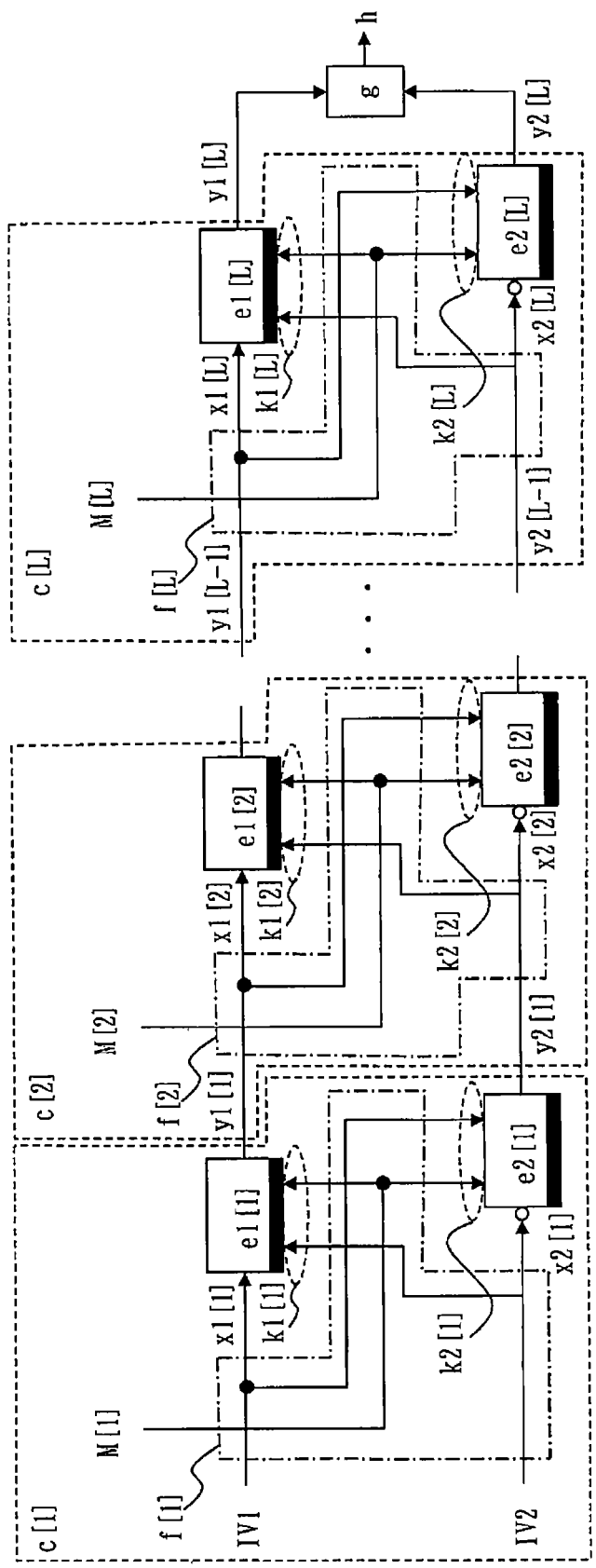
FIG. 9 is a structural diagram of the arithmetic operation part of the hash function according to Embodiment 3.

FIG. 9 is a structural diagram of the arithmetic operation part of the hash function according to Embodiment 3.

In a top compression function c[1], first, upon input of three values including a value M[1], a fixed value IV1, and a fixed value IV2, a function f[1] outputs four values x1[1], x2[1], k1[1], and k2[1]. In the function f[1], the fixed value IV1 is made into the value x1[1]. The fixed value IV2 is made into the value x2[1] through inversion of the respective bits. The value M[1] and the fixed value IV2 in combination are made into a value k1[1]. The value M[1] and the fixed value IV1 in combination are made into a value k2[1]. Subsequently, for the value x1[1] as a plaintext and the value k1[1] as a key, the encryption function e1[1] outputs a value y1[1]. Also, for the value x2[1] as a plaintext and the value k2[1] as a key, the encryption function e2[1] outputs a value y2[1].

In a compression function c[i] for each i of i=2, ..., L, first, upon input of three values M[i], y1[i−1], and y2[i−1], a function f[i] outputs four values x1[i], x2[i], k1[i], and k2[i]. In a function f[i], a value y1[i−1] is made into a value x1[i]. The value y2[i−1] is made into a value x2[i] through inversion of the respective bits. The value M[i] and the value y2[i−1] in combination are made into the value k1[i]. The value M[i] and the value y1[i−1] in combination are made into the value k2[i]. Subsequently, for the value x1[i] as a plaintext and the value k1[i] as a key, an encryption function e1[i] outputs a value y1[i]. Also, for the value x2[i] as a plaintext and the value k2[i] as a key, an encryption function e2[i] outputs a value y2[i].

Embodiment 4

Embodiment 4, as with Embodiments 2 and 3, will explain a hash function in which functions f[1], ..., f[L] are more specified.

Embodiment 4 is the same as Embodiment 1 except for a function f.

Figure 10:
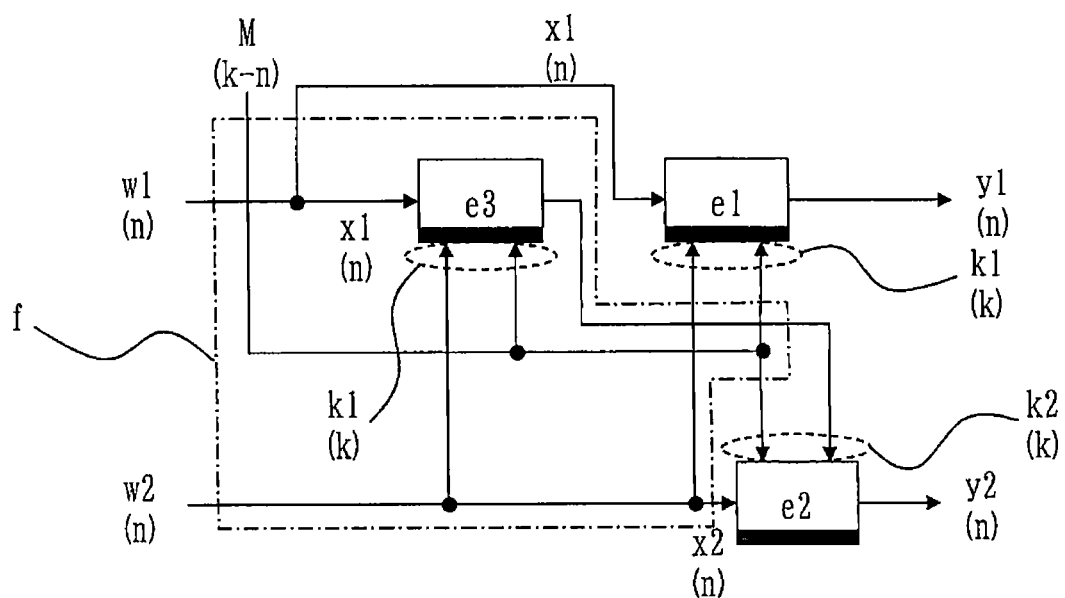
FIG. 10 is a structural diagram of a compression function c utilized in a hash function according to Embodiment 4.

FIG. 10 is a structural diagram of a compression function c utilized in the hash function according to Embodiment 4.

A compression function c is constituted using a function f, and two encryption functions e1 and e2 for a block cipher having an n-bit plaintext length and a k-bit key length. The encryption functions e1 and e2 are the same as the encryption functions e1 and e2 according to Embodiment 1.

The function f, upon input of three values M, w1, and w2, outputs four values x1, x2, k1, and k2. The value M has k−n bits. The values w1 and w2 each have n bits. The values x1 and x2 each have n bits. The values k1 and k2 each have k bits.

The function f makes the value w1 into the value x1, makes the value w2 into the value x2, and makes the value M and value w2 in combination into the value k1. The function f makes the value M and a value, which is outputted by an encryption function e3 for the value x1 as a plaintext and the value k1 as a key, in combination into the value k2.

The function f may arrange the bits of the value M and the bits of the value w2 in an arbitrary order, thus forming the value k1, and may arrange the bits of the value M and the bits of the value outputted by the encryption function e3 in an arbitrary order, thus forming the value k2. For example, the function f adds the bits of the value M after the bits of the value w2, thus forming the value k1, and adds the bits of the value outputted by the encryption function e3 after the bits of the value M, thus forming the value k2.

The encryption function e3 employed in the function f is a block cipher encryption function which, for an n-bit value as a plaintext and a k-bit value as a key, outputs an n-bit value. The encryption function e3 can be the same as the encryption function e1.

Figure 11:
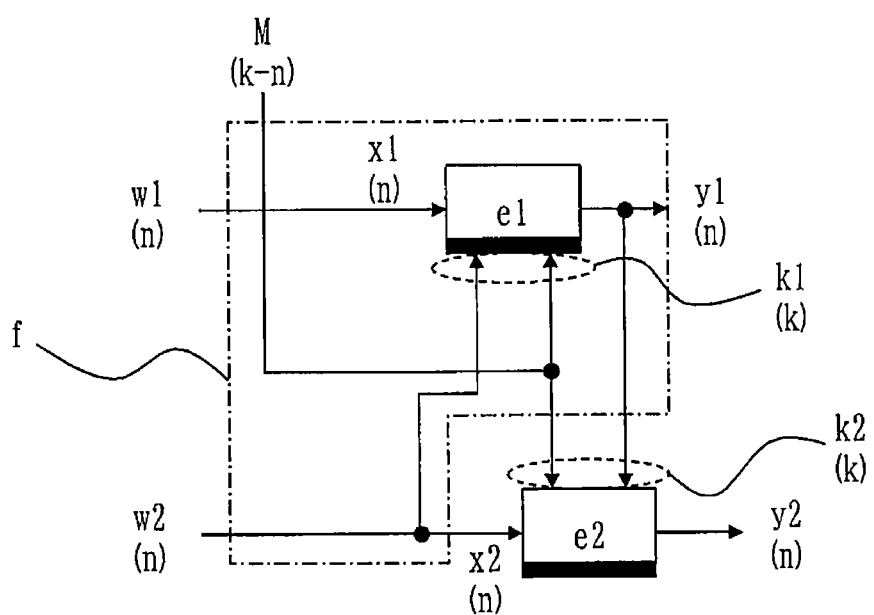
FIG. 11 is a structural diagram of a compression function c according to Embodiment 4 for cases where an encryption function e1 and an encryption function e3 are the same.

FIG. 11 is a structural diagram of the compression function c according to Embodiment 4 for cases where the encryption function e1 and the encryption function e3 are the same. In FIG. 11, the encryption functions e1 and e3 as a whole are treated as the encryption function e1.

Figure 12:
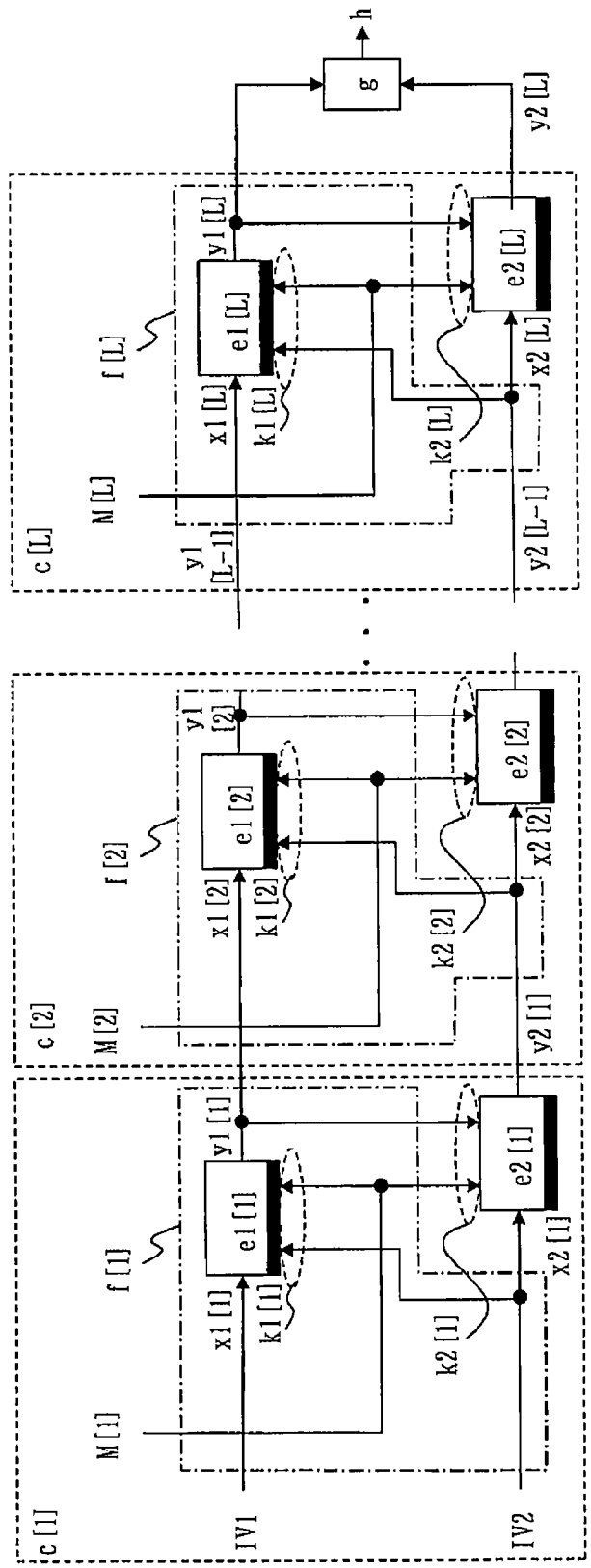
FIG. 12 is a structural diagram of the arithmetic operation part of the hash function according to Embodiment 4.

FIG. 12 is a structural diagram of the arithmetic operation part of a hash function according to Embodiment 4. In FIG. 12, the arithmetic operation part of the hash function is constituted using a compression function c for cases where the encryption function e1 and the encryption function e3 are the same.

In a top compression function c[1], first, upon input of three values including a value M[1], a fixed value IV1, and a fixed value IV2, a function f[1] outputs four values x1[1], x2[1], k1[1], and k2[1]. In the function f[1], the fixed value IV1 is made into the value x1[1]. The fixed value IV2 is made into the value x2[1]. The value M[1] and the fixed value IV2 in combination are made into a value k1[1]. For the value x1[1] as a plaintext and the value k1[1] as a key, the encryption function e[1] calculates a value y1[1] which, in combination with the value M[1], is made into the value k2[1]. Subsequently, for the value x2[1] as a plaintext and the value k2[1] as a key, the encryption function e2[1] outputs a value y2[1].

In a compression function c[i] for each i of i=2, . . . , L, first, upon input of three values M[i], y1[i−1], and y2[i−1], a function f[i] outputs four values x1[i], x2[i], k1[i], and k2[i]. In the function f[i], the value y1[i−1] is made into the value x1[i]. The value y2[i−1] is made into the value x2[i]. The value M[i] and the value y2[i−1] in combination are made into the value k1[i]. For the value x1[i] as a plaintext and the value k1[i] as a key, an encryption function e1[i] calculates a value y1[i] which, in combination with the value M[i], is made into the value k2[i]. Subsequently, for the value x2[i] as a plaintext and the value k2[i] as a key, an encryption function e2[i] outputs a value y2[i].

The hash value calculation device 10 described above is constituted by, for example, circuits and software. In cases where the hash value calculation device 10 is constituted by circuits, the processing device in the above description is, for example, an arithmetic operation circuit, and the memory is, for example, a register. In cases where the hash value calculation device 10 is constituted by software, the processing device in the above description is, for example, a CPU (Central Processing Unit), and a memory is, for example, a RAM (Random Access Memory). The input device in the above description is, for example, a keyboard or communication board, and the output device is, for example, a display device such as an LCD (Liquid Crystal Display), a communication board, or a memory such as a register or a RAM. The configuration of the hash value calculation device 10 is not limited to these examples, as a matter of course.

In cases where the hash value calculation device 10 is constituted by circuits, the "part" described above may be replaced by a "circuit". Alternatively, the "part" may be replaced by a "process", "device", "apparatus", "means", "procedure", or "function". Namely, the "part" may be implemented as firmware stored in a ROM (Read Only Memory). Alternatively, the "part" may be implemented by only software; by only hardware such as an element, a device, a substrate, or a wiring line; by a combination of software and hardware; or furthermore by a combination of software, hardware, and firmware.

REFERENCE SIGNS LIST

10: hash value calculation device; 11: arbitrary-length value input part; 12: padding part; 13: partitioning part; 14: default-length value input part; 15: compression function calculation part; 151: function f calculation part; 152: encryption function calculation part; 16: hash value calculation part

The invention claimed is:

1. A hash value calculation device that calculates a hash value using an encryption function for a block cipher having an n-bit plaintext length and a k-bit (k>n) key length, the hash value calculation device comprising:
   a default-length value input part, implemented by circuitry, that receives L (L is an integer of 2 or more) of values M[1], . . . , M[L] each having k-n bits;
   a compression function calculation part, implemented by the circuitry, that, for each integer i of i=1, . . . , L in an ascending order: calculates a function f[i] which, upon input of a value M[i] received by the default-length value input part, an n-bit value y1[i−1](a value y1[0] is a predetermined value IV1), and an n-bit value y2[i−1](a value y2[0] is a predetermined value IV2), outputs an n-bit value x1[i], an n-bit value x2[i], a k-bit value k1[i], and a k-bit value k2[i]; for the value x1[i] as a plaintext and the value k1[i] as a key, calculates an n-bit value y1[i] with the encryption function; and for the value x2[i] as a plaintext and the value k2[i] as a key, calculates an n-bit value y2[i] with the encryption function; and
   a hash value calculation part, implemented by the circuitry, that, upon input of a value y1[L] and a value y2[L] which are calculated by the compression function calculation part, calculates a hash value with an injective function g.

2. The hash value calculation device according to claim 1, wherein, for each integer i=1, . . . , L, the function f[i] is injective, and where the value M[i] is a fixed value, an injective relation holds between the value x1[i], the value x2[i] and the value y1[i], the value y2[i], and the value x1[i] and the value x2[i] are not equal, or the value k1[i] and the value k2[i] are not equal.

3. The hash value calculation device according to claim 1, wherein, for each integer i of i=1, . . . , L, the function f[i] is a function that makes the value y1[i−1] into the value x1[i], makes the value y1[i−1] into the value x2[i] through conversion with a substitute function p, and makes the value y2[i−1] and the value M[i] in combination into the value k1[i] and the value k2[i].

4. The hash value calculation device according to claim 1, wherein, for each integer i of i=1, . . . , L, the function f[i] is a function that makes the value y1[i−1] into the value x1[i], makes the value y2[i−1] into the value x2[i] through inversion of respective bits, makes the value M[i] and the value y2[i−1] in combination into the value k1[i], and makes the value M[i] and the value y1[i−1] in combination into the value k2[i].

5. The hash value calculation device according to claim 1, wherein, for each integer i of i=1, . . . , L, the function f[i] is a function that makes the value y1[i−1] into the value x1[i], makes the value y2[i−1] into the value x2[i], makes the value M[i] and the value y2[i−1] in combination into the value k1[i], and makes a value made from the value y1[i] and the value M[i] in combination into the value k2[i], the value y1[i] being calculated by the encryption function upon input of the value x1[i] and the value k1[i].

6. The hash value calculation according to claim 1, further comprising:
   an arbitrary-length value input part, implemented by the circuitry, that receives a value M having an arbitrary bit length;
   a padding part, implemented by the circuitry, that adds a predetermined value to the value M received by the arbitrary-length value input part and outputs a value M* having a bit length that is L times as large as (k-n) bits; and a partitioning part, implemented by the circuitry, that partitions the value M* generated by the padding part into L and outputs values M[1], ..., M[L] each having k-n bits, wherein the default-length value input part receives the values M[1], ..., M[L] outputted by the partitioning part.

7. A hash value calculation method of calculating a hash value using an encryption function for a block cipher having an n-bit plaintext length and a k-bit (k>n) key length, the method comprising:

a default-length value input step of, with an input device, receiving L (L is an integer of 2 or more) of values M[1], ..., M[L] each having k-n bits;

a compression function calculation step of, with a processing device, for each integer i of i=1, ..., L in an ascending order: calculating a function f[i] which, upon input of a value M[i] received in the default-length value input step, an n-bit value y1[i−1](a value y1[0] is a predetermined value IV1), and an n-bit value y2[i−1](a value y2[0] is a predetermined value IV2), outputs an n-bit value x1[i], an n-bit value x2[i], a k-bit value k1[i], and a k-bit value k2[i]; for the value x1[i] as a plaintext and the value k1[i] as a key, calculating an n-bit value y1[i] with the encryption function; and for the value x2[i] as a plaintext and the value k2[i] as a key, calculating an n-bit value y2[i] with the encryption function; and a hash value calculation step of, with the processing device, upon input of a value y1[L] and a value y2[L] which are calculated by the compression function calculation step, calculating a hash value with an injective function g.

8. A non-transitory computer-readable storage medium including computer executable instructions, wherein the instructions, when executed by a computer, cause the computer to perform a method of calculating a hash value using an encryption function for a block cipher having an n-bit plaintext length and a k-bit (k>n) key length, the method comprising:

receiving L (L is an integer of 2 or more) of values M[1], ..., M[L] each having k-n bits;

calculating a function f[i] which, for input of a value M[i] received by the receiving, an n-bit value y1[i−1](a value y1[0] is a predetermined value IV1), and an n-bit value y2[i−1](a value y2[0] is a predetermined value IV2) for each integer i of i=1, ..., L in an ascending order, outputs an n-bit value x1[i], an n-bit value x2[i], a k-bit value k1[i], and a k-bit value k2[i]; for the value x1[i] as a plaintext and the value k1[i] as a key, calculating an n-bit value y1[i] with the encryption function; and for the value x2[i] as a plaintext and the value k2[i] as a key, calculating an n-bit value y2[i] by the encryption function; and upon input of a value y1[L] and a value y2[L] which are calculated by the calculating, calculating a hash value through an injective function g.

\* \* \* \* \*